(12) United States Patent
Hehl

(10) Patent No.: US 6,825,582 B2
(45) Date of Patent: Nov. 30, 2004

(54) LINEAR MOTOR DRIVE UNIT FOR A MACHINE

(76) Inventor: Karl Hehl, Arthur-Hehl-Strasse 32, D-72290 Lossburg (DE)

(*) Notice: Subject to any disclaimer, the term of this patent is extended or adjusted under 35 U.S.C. 154(b) by 0 days.

(21) Appl. No.: 10/474,612

(22) PCT Filed: Apr. 10, 2002

(86) PCT No.: PCT/EP02/03970

§ 371 (c)(1),
(2), (4) Date: Oct. 10, 2003

(87) PCT Pub. No.: WO02/089302

PCT Pub. Date: Nov. 7, 2002

(65) Prior Publication Data

US 2004/0104624 A1 Jun. 3, 2004

(30) Foreign Application Priority Data

Apr. 12, 2001 (DE) .......................................... 101 18 420

(51) Int. Cl.$^7$ ............................................. H02K 41/00
(52) U.S. Cl. ...................................................... 310/12
(58) Field of Search ...................................... 310/12–15

(56) References Cited

U.S. PATENT DOCUMENTS

| | | | |
|---|---|---|---|
| 4,126,797 A | | 11/1978 | Kling |
| 4,344,022 A | * | 8/1982 | von der Heide ............ 318/38 |
| 4,897,582 A | | 1/1990 | Otten et al. |
| 5,214,323 A | * | 5/1993 | Ueda et al. .................. 310/12 |
| 5,760,500 A | * | 6/1998 | Kondo et al. ............... 310/12 |
| 5,763,965 A | * | 6/1998 | Bader .......................... 310/12 |
| 5,796,186 A | | 8/1998 | Nanba et al. |
| 5,973,459 A | | 10/1999 | Itoh |
| 6,713,900 B2 | * | 3/2004 | Yamada ....................... 310/12 |

FOREIGN PATENT DOCUMENTS

| | | |
|---|---|---|
| DE | 197 29 976 | 1/1999 |
| DE | 100 20 338 | 11/2000 |
| DE | 199 20 626 | 11/2000 |
| EP | 0 280 743 | 11/1992 |

OTHER PUBLICATIONS

English Abstract of JP 09065511.
International Search Report for PCT/EP02/03970 dated Nov. 7, 2002.

* cited by examiner

*Primary Examiner*—Thanh Lam
(74) *Attorney, Agent, or Firm*—Cantor Colburn LLP (57) ABSTRACT

A drive unit for a machine comprising a plurality of linear motors, which are disposed parallel to each other in a common direction of feed, the parts of the linear motors with the same action being interconnected for common displacement, wherein the linear motors include magnetic elements in the direction of feed and coil elements communicating therewith, wherein at least one power unit is associated with the linear motors, wherein force determining means are provided for determining the path-dependent force of the linear motors at least during assembly or commissioning and in that, in the operating state, a controller regulates, to a required characteristic, the power which is supplied to the linear motors by the power unit in dependence on the force, which is dependent on the path position of the linear motors and is determined by the force determining means.

15 Claims, 8 Drawing Sheets

LINEAR MOTOR DRIVE UNIT FOR A MACHINE

REFERENCE TO RELATED APPLICATIONS

The present application claims priority of German Patent Application 101 18 420.4, filed on Apr. 12, 2001, the disclosure of which is hereby expressly also made the object of the present application.

1. Description

The invention relates to a drive unit for a machine, more especially an injection molding machine for processing plastics materials and other plasticizable substances.

2. State of the Art

DE 199 20 626 A1 makes known this type of drive unit, where a plurality of linear motors are stacked to form one drive unit. The linear motors are cylindrical and magnets are disposed on the lateral surfaces of the rotor as well as stator windings being disposed on the lateral surfaces of the stator. A plurality of lateral surfaces with the same action are interconnected and are operated in common.

Tests have shown that by stacking together a plurality of linear motors which are connected to form one drive unit, although simultaneously the power can be increased and there is a compact design, the drive unit in operation exhibits a sinusoidal force characteristic. The sinusoidal force characteristic is produced by the basic principle of magnetic elements of the linear motor disposed in rows in the rotor and includes a wave length which corresponds approximately to the length of the magnetic element. To eliminate this effect, DE 100 20 338 A1 consequently already proposes that where there is a plurality of linear motors operated in parallel, the angle of the electric motors is offset in a stepped manner. Nevertheless production tolerances and wear and tear can result in oscillations in the force characteristic.

DE 197 29 976 A1 has already established that where there is linear displacement, the coupling between the magnetic poles, on the one hand, and the conductors of the current-carrying coils, on the other hand, is not constant in dependence on the geometric position of the two parts relative one to the other, i.e. for example when the two parts are displaced. This means the tangential force generated in dependence of the location or respectively of the position of the displaced part is no longer constant. Test results show oscillations in the force characteristic from up to 40%.

To solve this problem, it has already been proposed in DE 197 29 976 A1 that the terminal edges of the magnetic elements be sloped or respectively that a plurality of part magnets, which are rectangular in shape, be offset one relative to the other along the surface of the rotor.

U.S. Pat. No. 5,973,459 A specifies a required force characteristic for a linear motor in dependence on the path position of the linear motors. In this case it is assumed that the formula of the magnetic field characteristic is known. A force determining means is not available.

A linear motor for use in an injection molding machine is also proposed in EP 0 280 743 A1, however the application in that case purely tackles the problem in FIGS. 4 to 7 of how the displacement of the linear motor is generated when the various phases are connected.

SUMMARY OF THE INVENTION

Proceeding from this state of the art, an exemplary embodiment of the invention is a drive unit for a machine which shows a steady force characteristic when a linear motor is used.

In this solution attempts are made to balance out the differences in the feeding force which are location-dependent using automatic control technology. The force characteristic is regulated over the path of the linear motor by the power of the individual linear motors being controlled via a power unit. To this end, at least at assembly, preferably also when the linear motor is operating, the force characteristic is determined with a force determining means. The results obtained in this manner are used in the operating state to control or respectively regulate the output of the power units, such that the desired force characteristic is produced. Consequently, there is an "intelligent" system, which can smooth the force characteristic independent of limiting conditions and production tolerances.

This automatic control solution can be superposed by a mechanical solution, where the magnetic elements and/or coil elements of the linear motors, which are connected in parallel relative to one to another, that is different linear motors which together form the drive unit, are offset relative one to the other. This means that the force characteristics of the different linear motors can be superposed in such a manner that as steady a force characteristic as is extensively possible is produced.

A further smoothing of the force characteristic can be achieved, where applicable, also independently of each other, i.e. for example with different stepped stages, the magnets are offset in a stepped manner along the circumference of the lateral surfaces of the linear motors.

BRIEF DESCRIPTION OF THE FIGURES

The invention is described in more detail below by way of the enclosed drawings. In which.

DETAILED DESCRIPTION OF PREFERRED EXEMPLIFIED EMBODIMENTS

The invention is now described in more detail as an example with reference to the enclosed drawings. However, the exemplified embodiments are only examples which are not to restrict the inventive concept to a specific disposition.

Figure 1:
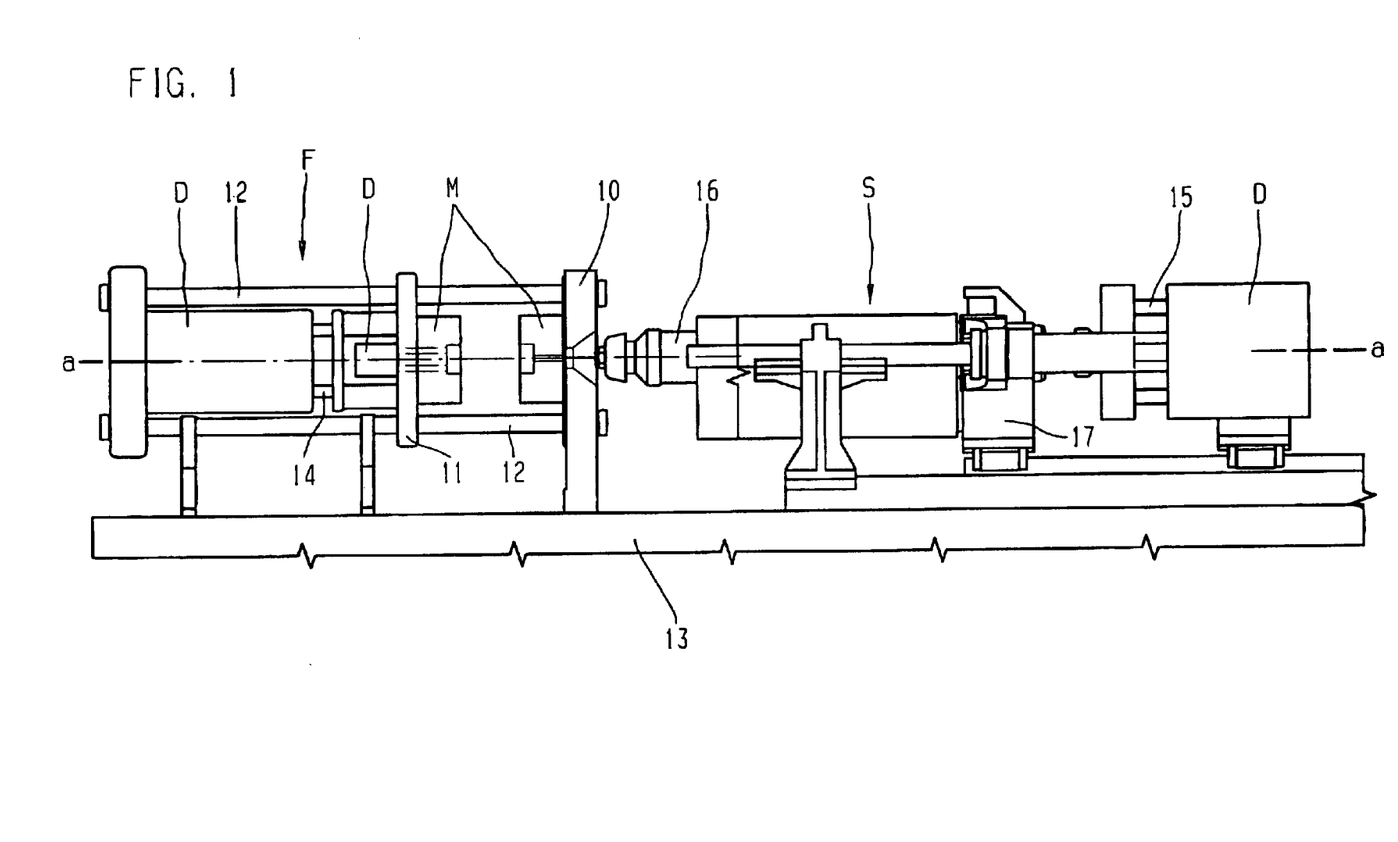
FIG. 1 is a side view of a machine, in this case an injection molding machine including a plurality of drive units.

FIG. 1 shows a side view of an injection molding machine for processing plastics materials and other plasticizable substances such as, for example, ceramic or powdery substances, which injection molding machine includes a plurality of drive units D. The drive unit described below can be used equally well on other arbitrary machines where linear drives are usable. The exemplified embodiment is described in more detail below by way of the injection molding machine.

A plastics material injection molding machine of this type has an injection molding unit S as well as a mold closing unit F, which are disposed on a machine base 13. An injection mold M is receivable between a stationary mold carrier 10 and a displaceable mold carrier 11 which is operated by a drive unit D, which injection mold M is displaced in a cyclical manner by the mold closing unit F. The drive unit D for closing the mold is connected to the stationary mold carrier 10 via tie bars 12, the tie bars 12 also acting for the most part at the same time as guiding means for the displaceable mold carrier 11. When the drive unit D is actuated, the displaceable mold carrier 11 is additionally guided on guiding elements 14.

With the injection mold M closed, the injection molding unit S in the plasticizing cylinder 16 injects plasticized material into the mold cavity of the injection mold M. The plasticizing cylinder 16 is accommodated on an injection bridge 17. The injecting and withdrawing movement, that is the axial displacement of the feeding screw, which is accommodated in the plasticizing cylinder 16 and is not illustrated in the drawings, is generated via the drive unit D on the injection mold side. The drive unit D in this case is penetrated by guiding means 15. The drive unit D can also be used on the mold-closing side in the region of the ejecting means.

In principle, this type of drive unit D can be used in a preferable manner wherever linear displacement has to be generated in a target-accurate manner with a lot of force. This also applies in principle outside the region of the injection molding machine, as mentioned above.

Figure 2:
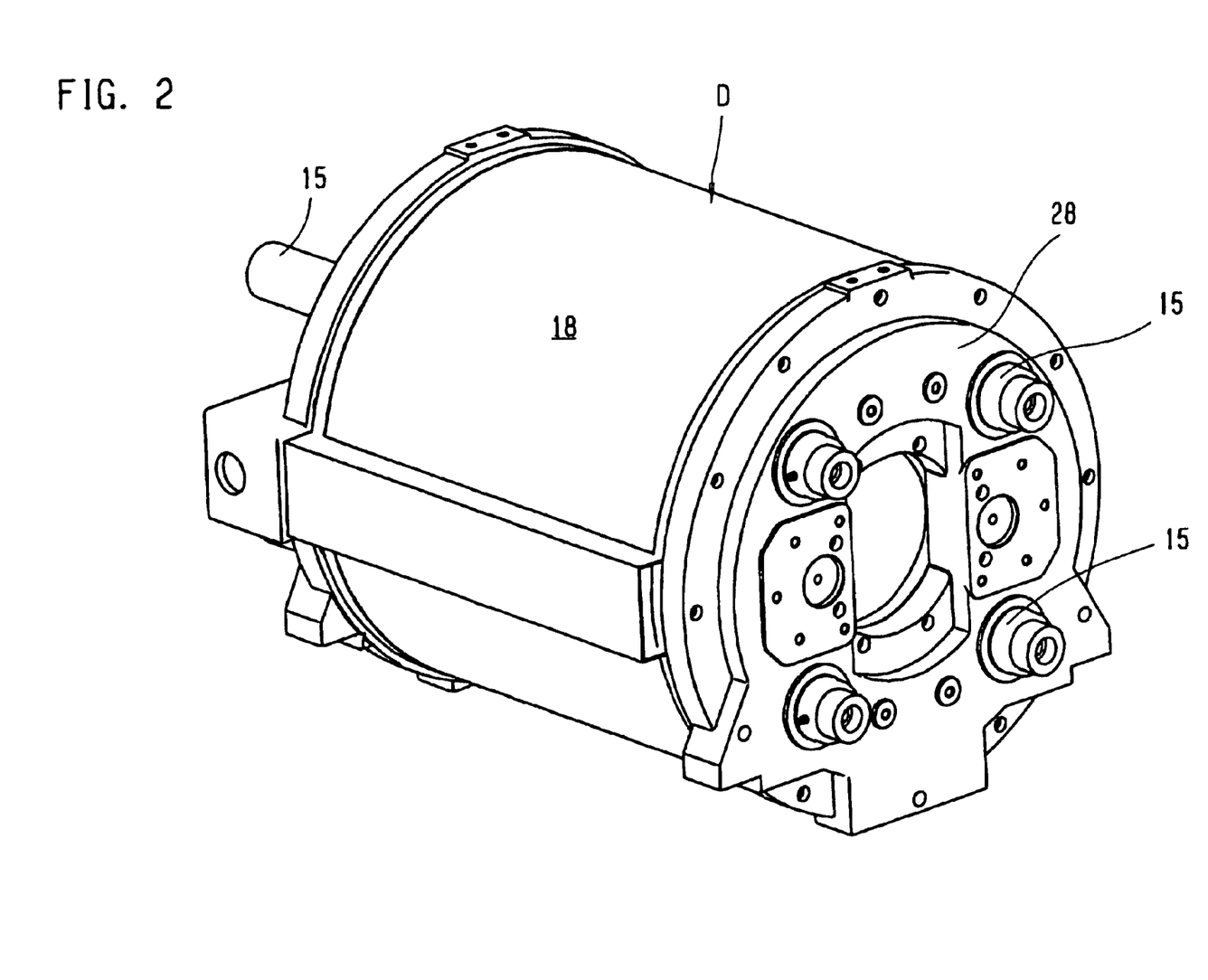
FIG. 2 is an isometric representation of the driving means for the injection molding machine.

The drive unit D, according to FIG. 2, is disposed in a housing 18, which is closed by means of a cover 28. For the guiding of the drive unit D, the housing is penetrated by the guide members 15. The exemplified embodiment is described in more detail below by way of the driving means for the axial traveling motion of the screw represented in FIG. 2.

Figure 3:
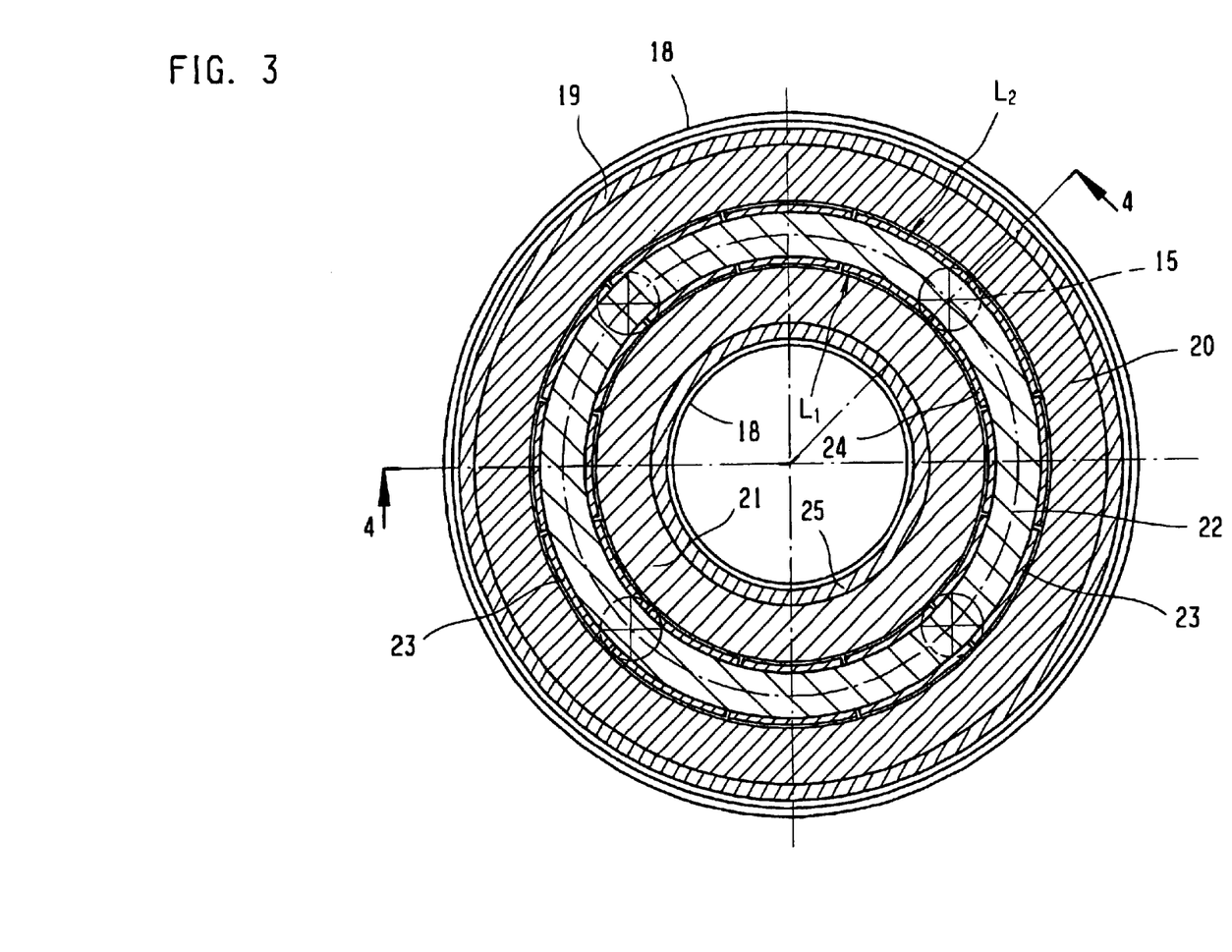
FIG. 3 is a cross-section through the drive unit in FIG. 2.

Common to the exemplified embodiments is that in principal a plurality of linear motors (L1, L2) are provided disposed parallel relative to one another in a common direction of feed, the parts of the linear motors (L1, L2) having the same action being interconnected for common displacement. In the exemplified embodiment, the linear motors are disposed cylindrically and coaxially relative to one another such that they can be nested into one another in accordance with FIGS. 3 and 4, however in principle it is sufficient for the principle of the invention that a plurality of linear motors are simply disposed parallel relative to one another but are interconnected for common displacement.

Figure 4:
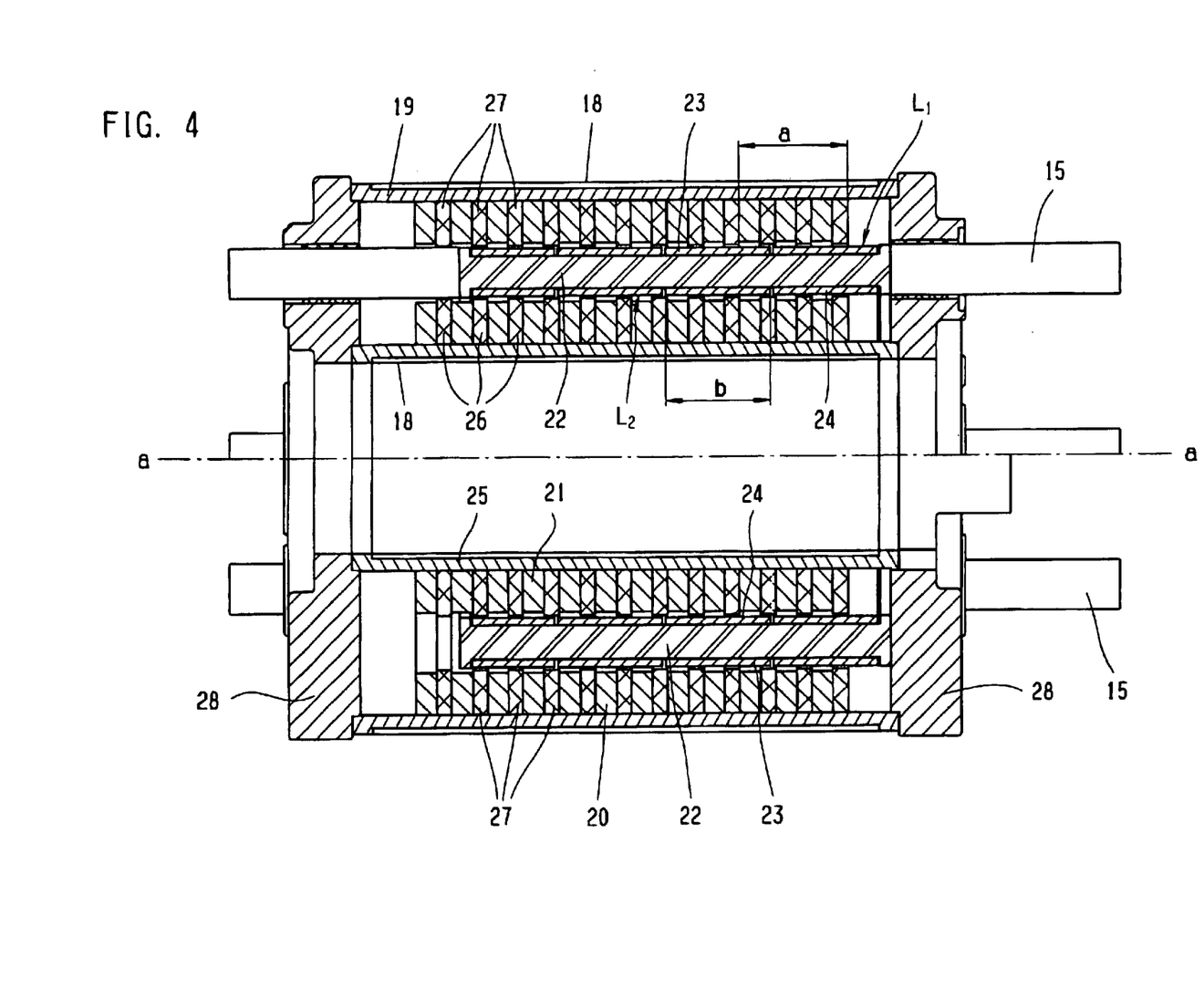
FIG. 4 is a section according to line 4—4 in FIG. 3 in a specific embodiment according to the state of the art.

FIG. 4 shows a linear motor, such as is known in DE 199 20 626 A1. The two linear motors L1, L2 include, in the direction of feed a—a, magnetic elements 23, 24, which are arranged in rows adjacent one another, and coil elements 26, 27, which are in operative connection therewith, on oppositely situated and yet interacting faces. The length b of the magnetic elements 23, 24 and the length a of a set of coil elements is preferably identical. The number of coil elements, which are connected to form a set, is dependent on the number of phases, with which the motor is operated. During operation, the coil elements associated with the individual phases, are connected one after another such that a magnetic field is induced. This means that the magnetic elements 23, 24 are alternately attracted or repelled such that the desired displacement of the linear motors (L1, L2) or respectively the drive unit D is produced. During the movement, the parts of the drive unit are guided on the guide members 15. This produces, on the one hand, a compact design and, on the other hand, means that the parts of the motors are guided carefully into one another.

Figure 8:
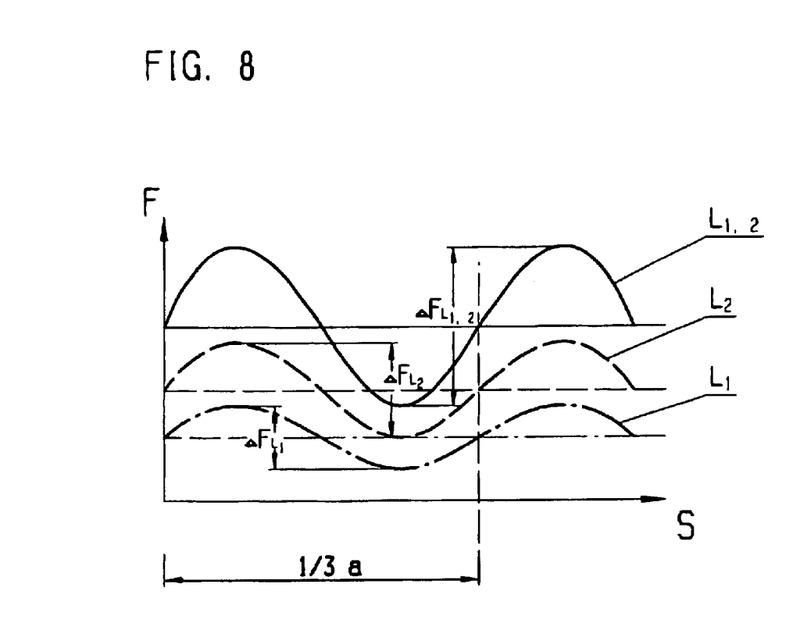
FIGS. 8, 9 are a force characteristic with the linear drive displaced according to the state of the art as well as according to the solution according to the invention.

In FIG. 4, according to the state of the art, the magnetic elements 23, 24 and the coil elements 26, 27 of the two—in this case—linear motors are disposed in the section shown in coincidence with one another. This has the disadvantage that, during a linear movement, the coupling between the magnetic poles on the one side and the coil elements on the other side is not constant in dependence on the geometric position of the two parts relative one to another. This results in periodic oscillations in tangential force, as are represented in FIG. 8. Whilst the individual linear motors (L1, L2) each still only have a small force oscillation $\Delta FL1$ or respectively $\Delta FL2$, the coincidence results in a strengthening of this oscillation, which is discovered again in $\Delta FL1$, L2.

In general it is true that conventionally between the measurement a (=length of the coil set) and the measurement b (=length of the magnetic element) there is an integral relationship. At the same time, one magnet length b should be overlapped at least by one set of coil elements 26, 27. Optimum results are obtained where the lengths a, b are identical, however, where needed, the length b of the magnetic element 23, 24 can also be an integral multiple of the length of the set of coil elements 26, 27.

Figure 5:
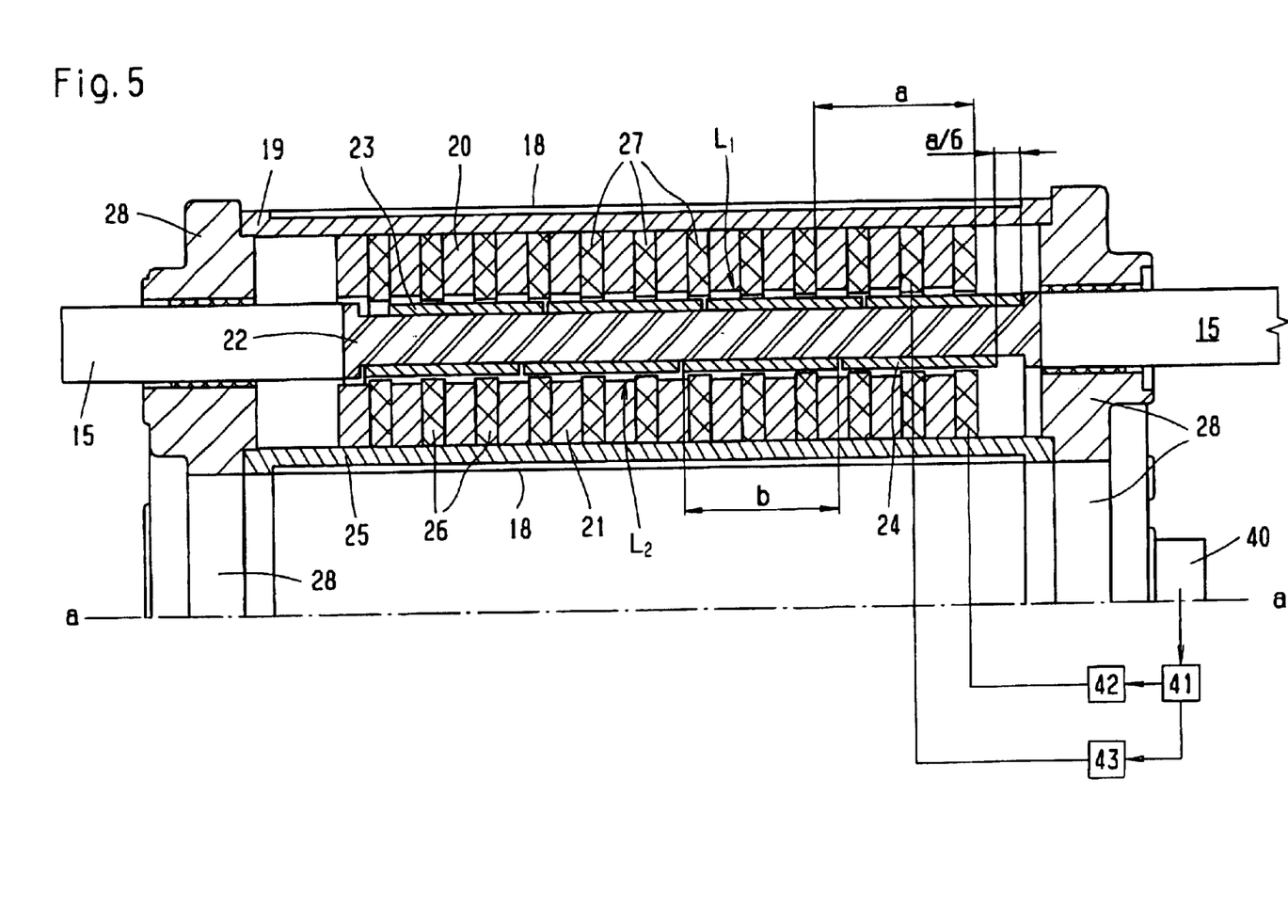
FIG. 5 is a cut-out analogous to FIG. 4 in a first specific embodiment according to the invention.
Figure 6:
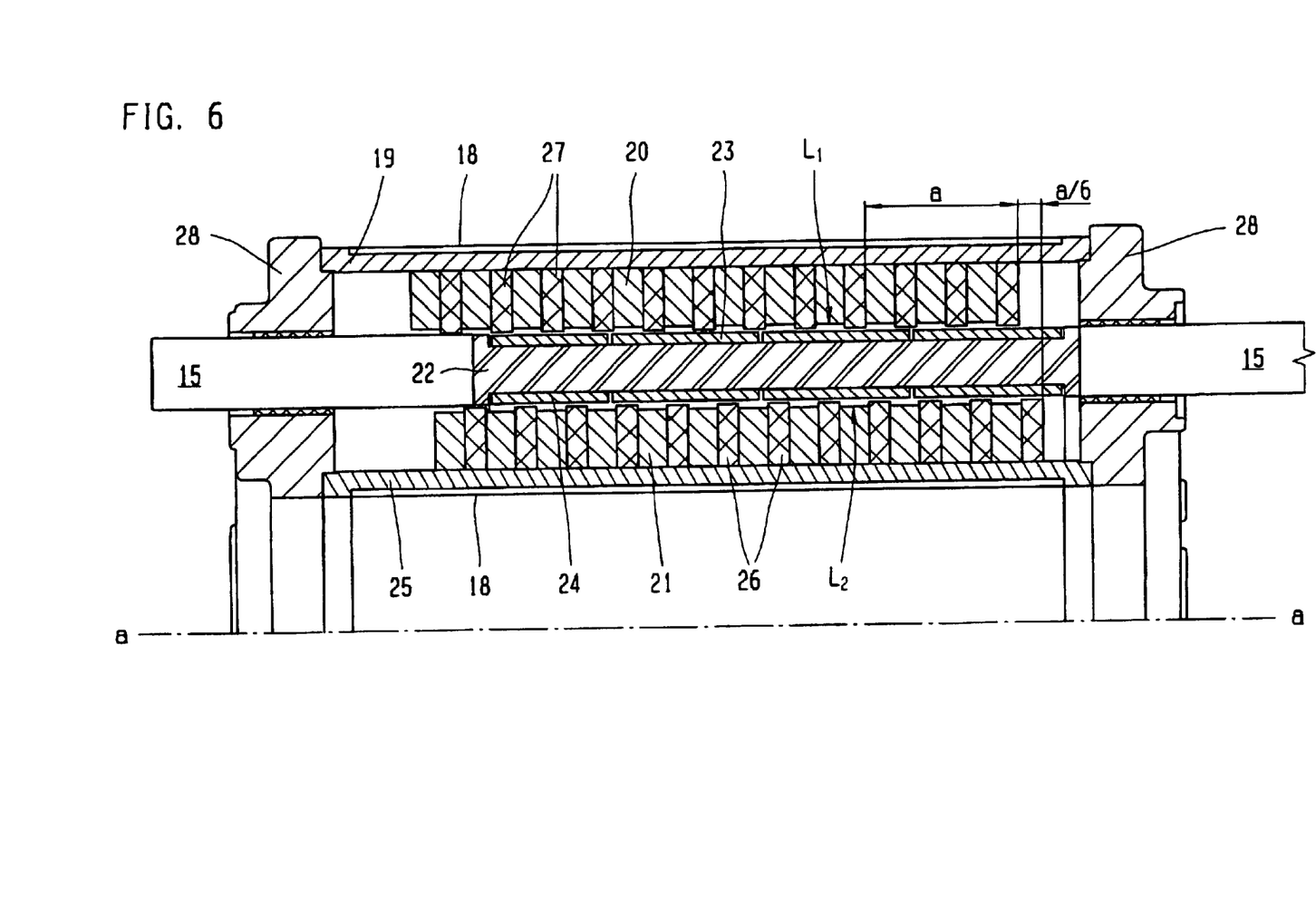
FIG. 6 is a representation according to FIG. 5 in a second specific embodiment.
Figure 7:
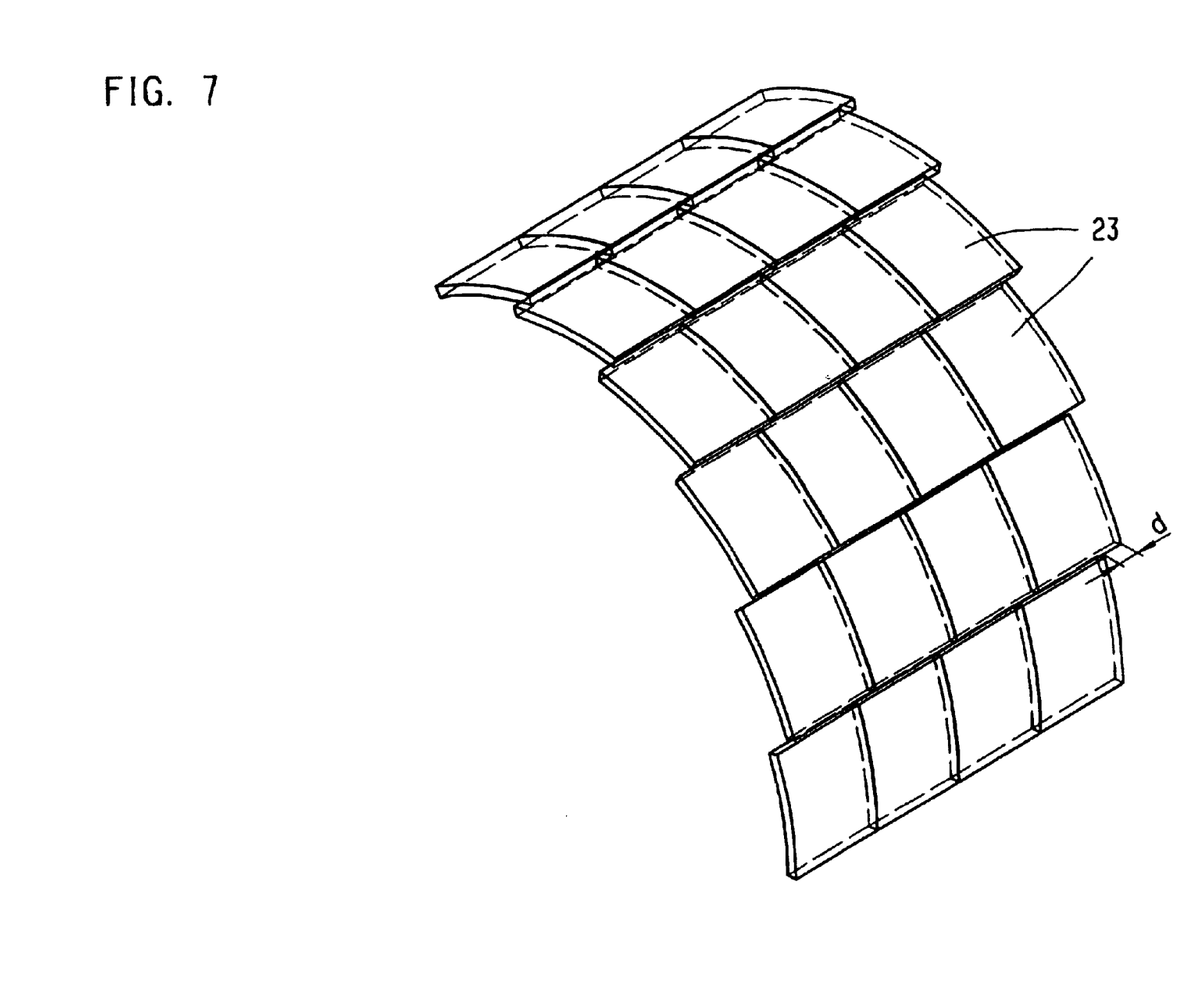
FIG. 7 is the stepped displacement of the magnetic elements along the circumference of the magnet carrier.

To balance out the location-dependent differences in the feed force, the magnetic elements 23, 24 in FIG. 5 and the coil elements 26, 27 in FIG. 6 of the different linear motors L1, L2 are offset relative to one another in the direction of feed a—a. In principle, however, both the magnetic elements 23, 24 and the coil elements 26, 27 can be offset relative to one another in the same drive unit. The displacement v can be calculated according to the formula $$v=a/(p)\times 2)$$

where
p=number of phases of the motor
a=length of one coil set with p phases.

Figure 9:
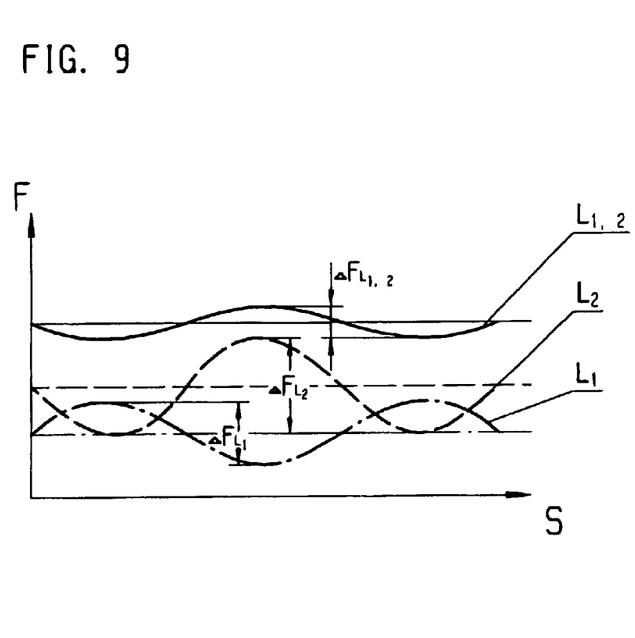

With a three-phase motor, this results, as in FIG. 5 or respectively FIG. 6, in the displacement of a/6, with a two-phase motor the displacement would correspond to a/4 in order to obtain as good a smoothing as possible. A disposition of this type results in a force characteristic as in FIG. 9. The differences in the force characteristic along the path s, that-is-to-say $\Delta FL1$ to $\Delta FL2$, are now phase shifted such that the upper smoothed characteristic is produced.

In place of the mechanical solution, where the magnetic elements 23, 24 and/or the coil elements 26, 27 are offset relative to one another as in FIG. 5 or respectively 6, and where applicable however in addition to this mechanical solution, attempts can also be made using automatic control technology to smooth the force characteristic via corresponding power units 42, 43. A regulating means for this purpose is represented schematically in FIG. 5, which regulating means includes a force determining means 40, a controller 41 and at least one power unit 42, 43. In dependence on the force determined in a path-dependent manner, the force of the linear motor is controlled or regulated by this regulating means to a required characteristic depending on the path position of the rotor relative to the stator of the linear motor. This can be effected via a power unit which then acts upon the common force characteristic, preferably however, a separate power unit 42, 43 is associated with each linear motor L1, L2 respectively to enable better regulation. In this case, they can be regulated independently from one another regarding their output. Therefore, it is not the summarizing characteristic of the two linear motors that is acted upon, instead of which, if the one motor has a low point, it is then operated in a stronger manner, even if at that moment the other linear motor is at its high point.

In principle, it is sufficient if this occurs once after the assembly of the linear motor, as the position of the magnetic elements no longer alters and consequently the oscillations in the feed force are known. In this case, the once-determined characteristic of the power, which is supplied to the respective linear motors, is fixed for further use and the driving means is operated in a correspondingly controlled manner. However, it is also sensible to regulate the required characteristic in a continuous manner, as changes in the force characteristic can be caused by both external limiting conditions or wear and tear. The force characteristic is regulated over the path of the linear motor by a power controlling means or respectively a power regulating means for the individual linear motors which is effected by at least one power unit. To this end, at least at the assembly, preferably however also during the operation of the linear motor, the force characteristic is determined using a force determining means. The results obtained in this manner are used in the operating state for controlling or respectively regulating the output of the power units, such that the desired force characteristic is produced. As said, this can be superposed by the mechanical solution.

The exemplified embodiments show a disposition with cylindrical linear motors, which are nested into one another. The magnetic elements 23, 24 of the two linear motors L1, L2 are disposed on a magnet carrier 22, whilst the coil elements 26, 27 are disposed on a coil ring 20 or better coil cylinder on the outside and a coil ring 21 or better coil cylinder on the inside. In this respect the coil rings represent the stator. This nesting produces a space-saving design, however it is possible in principle, in place of this disposition, to dispose different linear motors L1, L2 symmetrically relative to a common effective axis a—a, although in this case it should preferably be noted that a symmetrical force characteristic is also produced along the direction of feed a—a, that-is-to-say, for example, along a central effective axis between the different linear motors. This can, for example, be effected by four linear motors being disposed in pairs diagonally opposite one another, from which each two are disposed in pairs symmetrically relative to the central axis and are configured identically with regard to the disposition of the magnetic or coil elements.

In the concrete exemplified embodiment in FIGS. 5 and 6, the magnetic elements 24 and/or coil elements 26 of the linear motor L2 on the inside are offset axially relative to the magnetic elements 23 and/or coil elements 27 of the linear motor on the outside, in such a manner that the location-dependent differences in the force of the feed are eliminated.

The desired smoothing of the force characteristic can be increased by the magnetic elements 23, 24 and coil elements 26, 27 of at least one linear motor L1, L2 being offset in a stepped manner along its circumference as in FIG. 8, that-is-to-say, for example, on the lateral surface of the hollow cylindrical rotor (magnet carrier 22). It is conceivable in this case to select the stepped displacement d of the individual linear motors L1, L2 differently and consequently independently of one another. In principle, it is also possible to select the length a of the magnetic elements for the individual linear motors independently of one another, it simply having to be ensured that the length b of the set of coil elements 26, 27 is tuned to the length a. It would also be conceivable to dispose the coil elements in the form of an ellipsoid on the lateral surface of the cylindrical linear motor.

It is obvious that this description can be subject to the most varied modifications, changes and adaptations which range in the region of equivalents to the attached claims.

List of References

10 Stationary mold carrier
11 Displaceable mold carrier
12 Guiding brace
13 Machine base
14, 15 Guide means
16 Plasticizing cylinder
17 Injection bridge
18 Housing
19 Lateral surface
20 Coil ring outside
21 Coil ring inside
22 Magnet carrier
23, 24 Magnetic element
25 Inside lateral surface
26, 27 Coil element
28 Cover
40 Force determining means
41 Regulating means
42, 43 Power unit
a Length of a set of coil elements
b Length of a magnetic element
a—a Direction of feed
d Displacement
s Path
D Drive unit
F Mold closing unit
L1, L2 Linear motor
M Injection mold
S Injection molding unit

What is claimed is:

1. Drive unit for a machine comprising a plurality of linear motors, which are disposed parallel to each other in a common direction of feed, the parts of the linear motors with the same action being interconnected for common displacement, wherein the linear motors include magnetic elements in the direction of feed and coil elements communicating therewith, wherein at least one power unit is associated with the linear motors, wherein force determining means are provided for determining the path-dependent force of the linear motors at least during assembly or commissioning and in that, in the operating state, a controller regulates, to a required characteristic, the power which is supplied to the linear motors by the power unit in dependence on the force, which is dependent on the path position of the linear motors and is determined by the force determining means.

2. Drive unit according to claim 1, wherein the magnetic elements are disposed so as to be polarized alternately in the direction of feed and in that the magnetic elements and the coil elements are provided on oppositely situated faces, wherein the magnetic elements and/or coil elements at least of one linear motor are offset in the direction of feed relative to the magnetic elements of the at least one other linear motor.

3. Drive unit according to claim 1, wherein the magnetic elements are disposed so as to be polarized alternately in the direction of feed and in that the magnetic elements and the coil elements are provided on oppositely situated faces, wherein the magnetic elements and/or coil elements at least of one linear motor are offset in the direction of feed relative to the coil elements of the at least one other linear motor.

4. Drive unit according to claim 1, wherein a separate power unit is associated with each linear motor.

5. Drive unit according to claim 1, wherein the linear motors are disposed so as to be symmetrical relative to a common effective axis, which lies parallel to the direction of feed.

6. Drive unit according to claim 1, the linear motors are disposed coaxially one to the other.

7. Drive unit according to claim 1, wherein the linear motors are cylindrical and nested into one another.

8. Drive unit according to claim 1, wherein a hollow cylindrical rotor in the form of a magnet carrier includes magnetic elements disposed on its two lateral surfaces, which magnetic elements interact with coil elements to form the drive unit which includes the two linear motors, said coil elements being disposed on lateral surfaces of coil rings which are configured as stators.

9. Drive unit according to claim 1, wherein the magnetic elements and/or coil elements of one linear motor situated on the inside are offset axially relative to the magnetic elements and/or coil elements of one linear motor situated on the outside.

10. Drive unit according to claim 1, wherein the common displacement is
$$v=a/(p\times 2),$$
where
 p=number of phases of the motor
 a=length of one coil set with p phases.

11. Drive unit according to claim 1, wherein the magnetic elements at least of one linear motor are offset in a stepped manner along its circumference.

12. Drive unit according to claim 11, wherein the stepped manner is a stepped displacement of each of the linear motors independent of each other.

13. Drive unit according to claim 1, wherein the length b of the magnetic elements of each of the linear motors and the length a of a set of coil elements of each of the individual linear motors, which length is tuned to the length of said magnetic elements, is independent of each other.

14. Drive unit according to claim 1, wherein the coil elements are disposed inclinedly relative to the feed direction in the form of an ellipsoid on the lateral surface of the linear motors.

15. Drive unit according to claim 1, wherein the machine is an injection molding machine for processing plastics materials and other plasticisable substances.

* * * * *